(12) United States Patent
Rhoads

(10) Patent No.: US 7,150,344 B2
(45) Date of Patent: Dec. 19, 2006

(54) ACTUATOR AND SLACK ADJUSTER

(75) Inventor: David C. Rhoads, Boonville, MO (US)

(73) Assignee: Haldex Brake Corporation, Kansas City, MO (US)

( * ) Notice: Subject to any disclaimer, the term of this patent is extended or adjusted under 35 U.S.C. 154(b) by 308 days.

(21) Appl. No.: 10/210,720

(22) Filed: Aug. 1, 2002

(65) Prior Publication Data
US 2006/0032714 A1 Feb. 16, 2006

(51) Int. Cl.
*F16D 65/56* (2006.01)
*F01C 9/00* (2006.01)

(52) U.S. Cl. .............. 188/203; 188/196 F; 92/120

(58) Field of Classification Search ........... 188/196 R, 188/197, 198, 199, 200, 203, 196 A, 196 C, 188/196 F, 196 M, 196 B, 306, 307; 92/120, 92/132, 130 D
See application file for complete search history.

(56) References Cited

U.S. PATENT DOCUMENTS

| | | | |
|---|---|---|---|
| 593,996 A | 11/1897 | Fish | |
| 3,051,143 A | 8/1962 | Nee | 121/48 |
| 3,137,214 A | 6/1964 | Feld et al. | 92/48 |
| 3,731,598 A | 5/1973 | Brignon et al. | 92/125 |
| 4,333,391 A | 6/1982 | Nash | 92/121 |
| 4,379,543 A | 4/1983 | Reaves | 251/59 |
| 4,960,036 A | 10/1990 | Gummer et al. | 92/63 |
| 5,386,761 A | 2/1995 | Holtgraver | 92/120 |

*Primary Examiner*—Xuan Lan Nguyen
(74) *Attorney, Agent, or Firm*—St. Onge Steward Johnston & Reens LLC

(57) ABSTRACT

A fluid operated brake actuator is provided composed of a common housing, a shaft rotatable within the housing, the shaft being rotatable to engage and disengage a brake, a vane connected to the shaft, the vane being responsive to fluid pressure to rotate the shaft, a torsion power spring for producing torque to bias the shaft in a first rotational direction; and an inlet port through the housing, the inlet port for introducing fluid pressure into the housing in order to exert a force on the vane in order to rotate the shaft against the bias of the spring.

11 Claims, 5 Drawing Sheets

ACTUATOR AND SLACK ADJUSTER

FIELD OF THE INVENTION

The present invention relates to a fluid operated brake actuator and slack adjuster in a pneumatic air braking system and method of using such an actuator and slack adjuster. More particularly, the present invention relates in one or more embodiments to a brake actuator wherein a biased torsional power spring is disposed over a rotatable shaft responsive to the application of fluid pressure.

BACKGROUND OF THE INVENTION

Heavy duty commercial vehicles use a complex pneumatic air braking system. During the operation of the vehicle, brake actuators within the system convert pneumatic fluid pressure into braking torque to be selectively applied by the driver to service brakes and/or a continuous force to defeat the spring brakes, i.e. parking/emergency brakes.

FIG. 2 illustrates a known brake actuator having a service brake chamber 101a and a spring brake chamber 101b in a common housing. To employ the service brakes, increased pneumatic pressure is fed into actuator 100 causing diaphragm 103 to plunge push rod 102 which connects to an arm that turns the brake camshaft.

As brake linings wear, the stroke length of the push rod must be adjusted. This is accomplished by moving slack adjuster 110.

Typically, brake actuators also include provisions for engaging the spring brakes by means of power spring 104 caged in compression in chamber 101b of the housing. Continuous pneumatic pressure on diaphragm 105 during operation of the vehicle further compresses power spring 104 and disengages the spring brake allowing vehicle movement. When the pressure drops below a predetermined level, power spring 104 extends within chamber 101b to the predetermined limits and plunges push rod 102 to reengage the spring brake in turn hindering vehicle movement.

Known brake actuator housings comprise a canister typically formed as two or more clam shells 106, 107 connected together in a tamper-resistant manner by means of restraining or clamping devices 108, 109. Since the power spring has a high spring constant, its compressed state in the actuator imparts it with significant potential energy. The improvident removal of the restraining device of the power spring chamber releases the stored energy and turns the clam shell housing into a projectile.

Significant injury and even death has been known to occur from improper handling. Thus, numerous patents have issued that address restraining or clamping devices that seek to prevent tampering and improper handling. However, such devices only reduce the potential injury by hampering access to the power spring chamber. A determined or ill-advised mechanic or driver may still defeat this safety feature.

Other patents have issued that disclose rotary actuators returned to their pre-engaged position by torsionally loaded springs. However, each discloses covers that are conventionally secured and upon removal releases the stored energy turning the cover into a projectile.

Therefore, what is desired is a brake actuator that is safer yet is fully functional as a fluid operated brake actuator. What is also desired is a brake actuator that does not cage a power spring in compression. Further, what is desired is a brake actuator that reduces the number of components, is easy to manufacture, simple and cost effective to maintain, and/or readily installed on vehicles.

SUMMARY OF THE INVENTION

In accordance with one aspect of the present invention, a fluid operated brake actuator comprising a common housing having a valve body, a cover; and a port for introducing a fluid pressure into the housing; a vane for producing a torque responsive to the fluid pressure; a rotatable shaft for operably engaging and disengaging a brake responsive to the torque, having an axis of rotation passing through the housing, and restrained by walls of the valve body; and a torsion power spring for biasing the shaft caged inside the housing substantially disposed on the axis of rotation of the shaft and over the shaft having one end portion secured to the shaft and the other end portion secured between the cover and the valve body.

In accordance with another aspect of the present invention, a method of manually adjusting the slack of a fluid operated brake actuator is provided, wherein the amount of slack is determined, and the clutch adjustment is ratcheted until the slack is eliminated.

Most conventional brake systems for heavy duty commercial vehicles employ compressed air as the fluid medium and as the source of pneumatic pressure and as such is contemplated in the embodiment described herein. However, a person of ordinary skill in the art will recognize that other media may be advantageously used in appropriate conditions. Therefore, the invention is not necessarily limited to compressed air medium but the inventive concept also includes adaptation to and/or use of other fluid media.

DETAILED DESCRIPTION OF THE DRAWINGS

Figure 1:
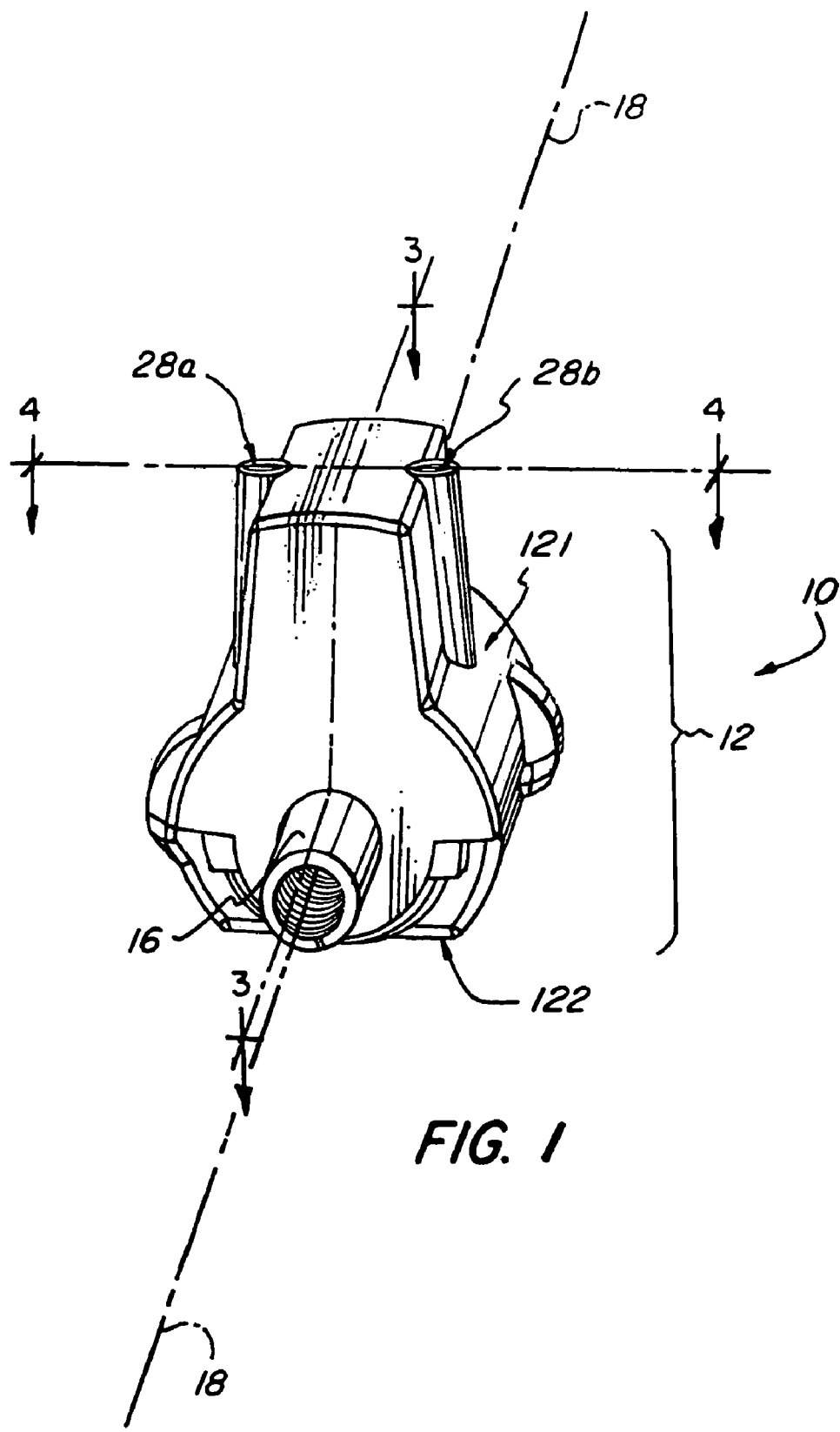
FIG. 1 illustrates a fluid operated brake actuator in accordance with one embodiment of the invention.
Figure 2:
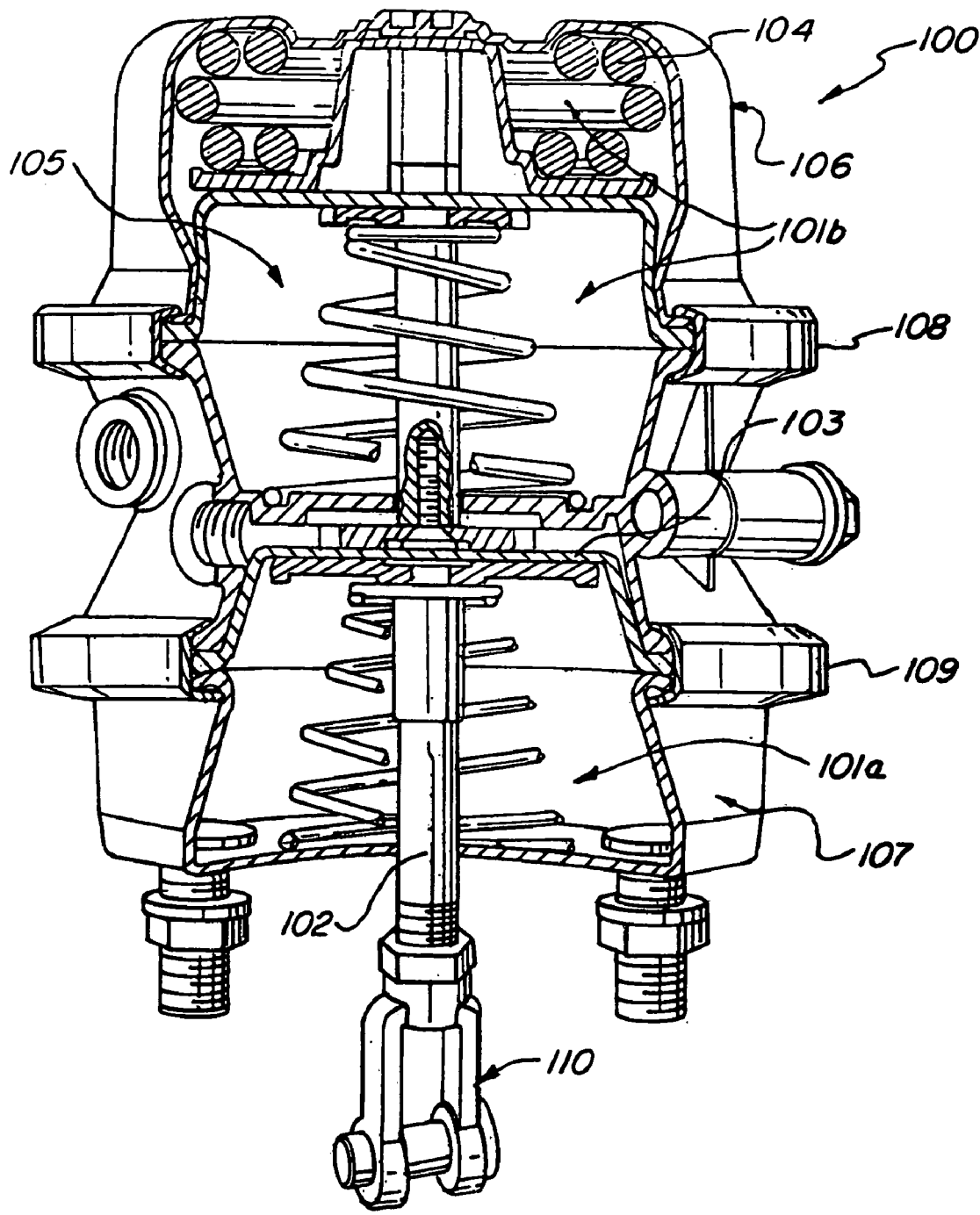
FIG. 2 illustrates a known brake actuator.

FIG. 1 illustrates a fluid operated brake actuator in accordance with one embodiment of the invention. Brake actuator 10 is illustrated in an isometric view. Visible from the outside is housing 12 comprising valve body 121 and cover plate 122; shaft 16, with hollowed portion 161; axis 18; and pneumatic ports 28a and 28b. In the interior, and not visible in this view, are power spring 14, vane 20, and bracket 22 which secures the vane to shaft 16.

In the illustrated embodiment, brake actuator 10 is a fluid operated brake actuator for actuating service and spring brakes upon selective action by a driver-operator. Vane 20 divides valve body 121 into a service side and a spring side and is responsive to pneumatic pressure introduced into each side through ports 28a and 28b by rotatably engaging shaft 16 upon fluid application. Shaft 16 then transfers torsion along axis of rotation 18 to the brake camshaft via a clutch in hollowed out portion 161. Power spring 14 torsionally biases shaft 16 to engage the parking/emergency brake in the absence of a greater pneumatic pressure.

Figure 3:
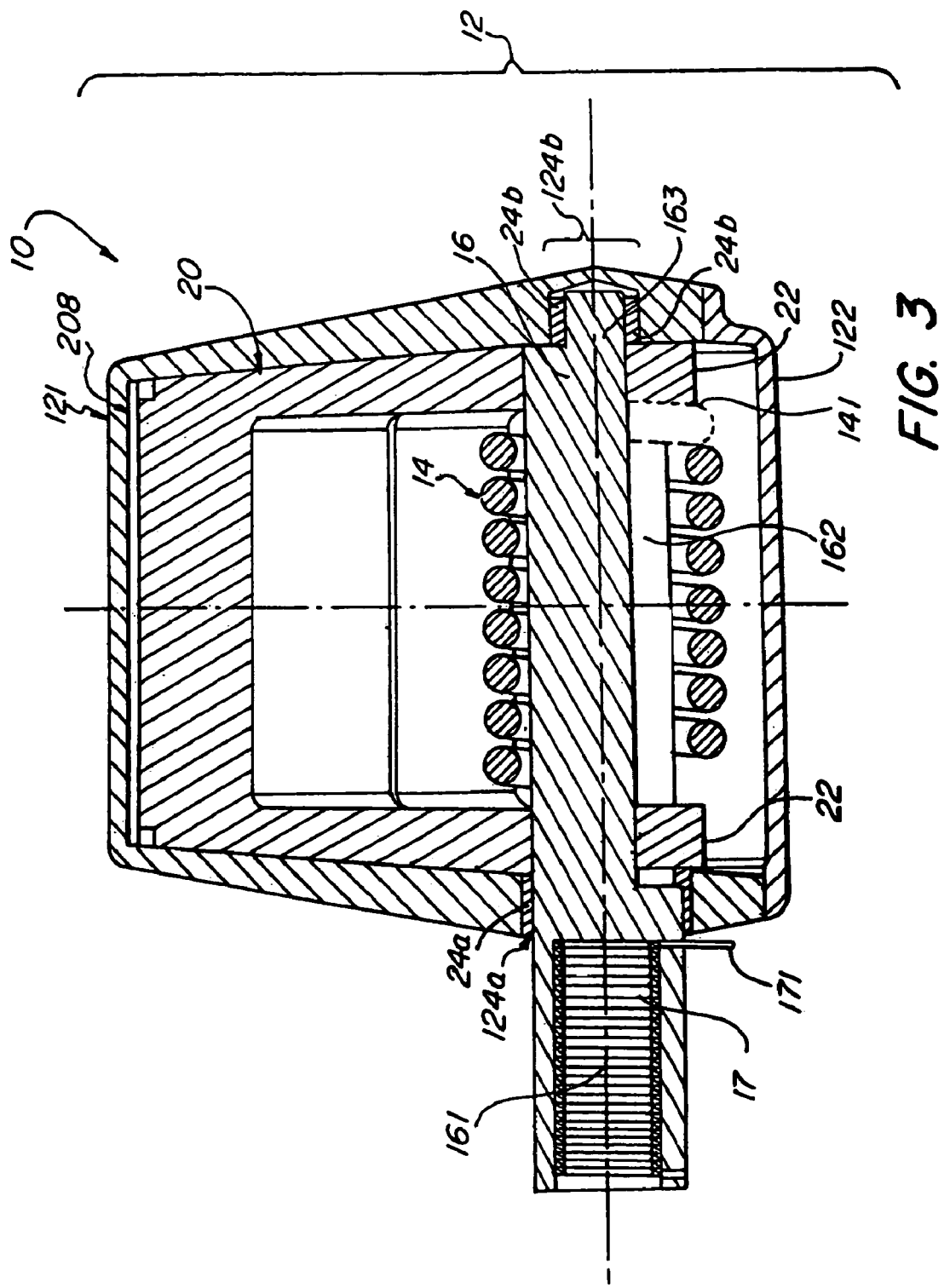
FIG. 3 is a cross-sectional view of a brake actuator in accordance with one embodiment of the invention along reference line 3—3 of FIG. 1.
Figure 4:
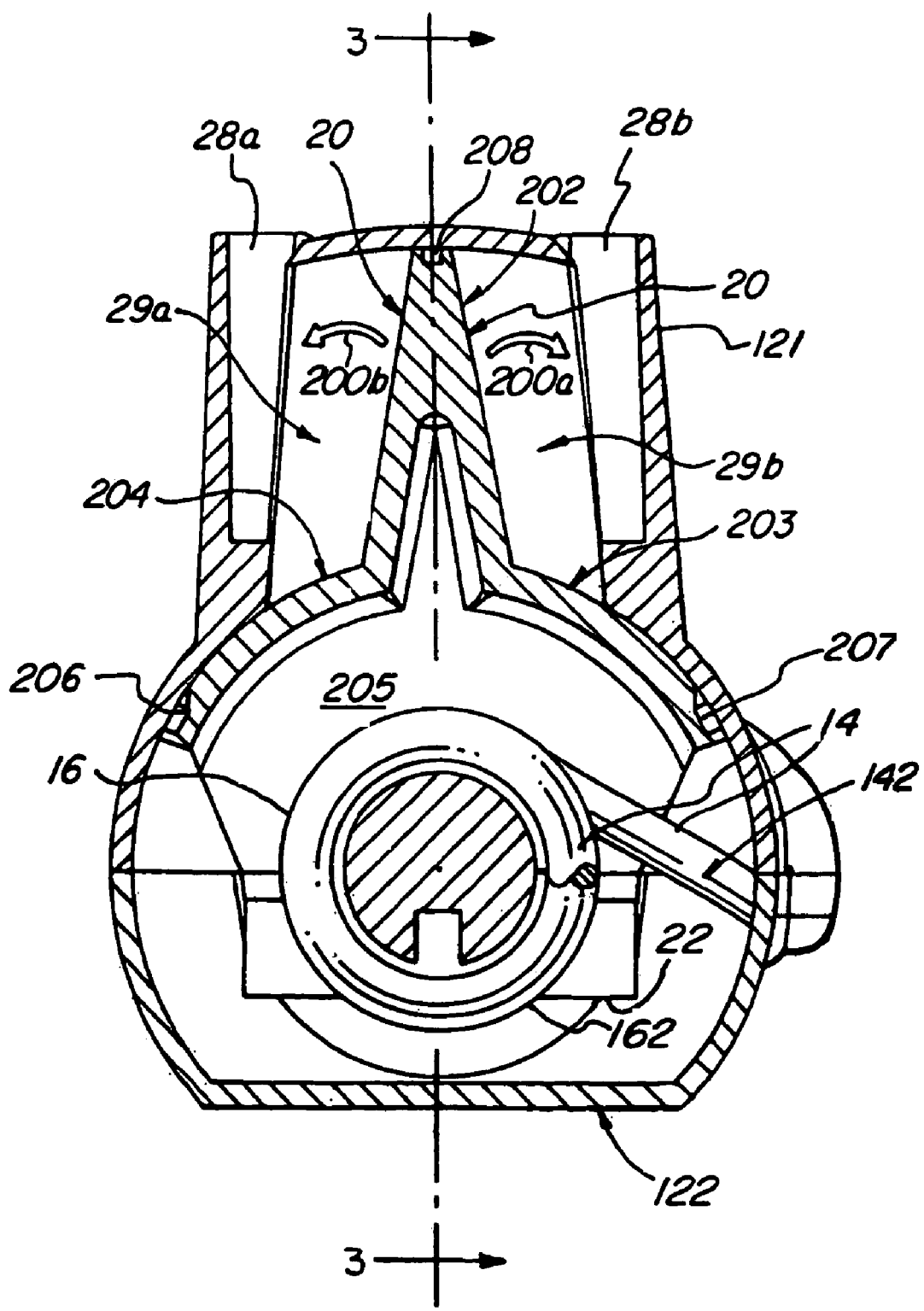
FIG. 4 is a cross-sectional view of a brake actuator in accordance with one embodiment of the invention along reference line 4—4 of FIG. 1.

FIG. 3 is a cross-sectional view of a brake actuator in accordance with one embodiment of the invention along reference line 3—3 of FIG. 1. FIG. 4 is a cross-sectional view of a brake actuator in accordance with one embodiment of the invention along reference line 4—4 of FIG. 1.

With reference to FIG. 3, brake actuator 10 includes power spring 14; shaft 16; spring clutch 17, and vane 20. Housing 12 includes valve body 121 and cover plate 122, both made of durable material to withstand pneumatic pressures commonly associated with air braking systems and the potential energy of power springs commonly associated with brake actuators.

Axis 18 is the axis of rotation of unmodified shaft 16 and passes through housing 12. Shaft 16 operably engages the brake camshaft (not shown) through spring clutch 17. Thus, shaft 16 is sized and made of any durable material so as to withstand bending and torsional stresses.

In the embodiment shown, shaft 16 has a substantially circular cross-section prior to modification of the cross-section to create hollowed portion 161, recess 162, and reduced diameter portion 163. Shaft 16 may instead of a circular cross-section have any other cross-sectional shape prior to any modifications. Shaft 16 may be a camshaft assembly operatively supplementing and/or replacing the brake camshaft.

Shaft 16 is rotatably retained in housing 12 by appropriately sized bushing 24a fitted in opening 124a and appropriately sized bushing 24b in recess 124b each disposed substantially on and/or concentric to axis 18.

Hollowed portion 161 receives spring clutch 17; recess 162 receives a finger of power spring 14; and reduced diameter portion 163 and bushing 24b mate with recess 124b of housing 12. However, recess 124b may instead of a recessed portion be any kind of other retaining feature, as for example an opening through housing 12. Thus, reduced diameter portion 163 may be proportioned similarly as to the embodiment of FIG. 3; or may be proportioned longer and/or larger; any other suitable proportion or shape to take advantage of such a retaining feature.

Power spring 14 is a spring having a high spring constant so as to bias shaft 16 to mechanically set the parking/emergency brake by applying torsional forces to shaft 16 and being made of any advantageous material such as nickel alloy. Preferably, power spring 14 is cylindrical; but any other spring shape including spiral, conical, barrel, wind-interrupted, or any other shape capable of accomplishing the required tasks may be used. A torsion bar may also be a suitable substitute as power spring 14.

Power spring 14 is caged inside housing 12 with a longitudinal axis substantially coincident with longitudinal axis 18. Two extensions protrude at each end and secure the spring within brake actuator 10. A first end, finger 141, is received by recess 162 and a second finger, finger 142, is secured in housing 12, between valve body 121 and cover 122, substantially transverse to axis 18.

In the embodiment shown, recess 162 receives finger 141 of power spring 14; slideably engages finger 141 in a longitudinal direction, as for example during assembly of actuator 10; and then secures it to shaft 16. Recess 162 may be any cross-sectional shape and length. In another embodiment, recess 162 may be sized as to directly receive finger 141 without engaging it slideably. In another embodiment, finger 142 is secured at a different angle in housing 12.

Methods are known to impart springs with potential energy, principally by winding the spring and effectively securing the ends to maintain torque. Winding power spring 14 about shaft 16 produces a torque in power spring 14 that is maintained as long as both finger 141 and 142 remain secured. Torque is lost, when fingers 141 and/or 142 become unsecured such as when cover 122 is removed releasing finger 142 or when finger 141 is dislodged from shaft 16 as when shaft 16 is forcibly removed from brake actuator 10—simultaneous action is physically improbable. In the first instance, the torque is released safely as power spring 14 spins around the shaft. In the latter instance, the torque is released safely in the closed housing.

Thus, compared to known brake actuators that retain the power spring in compression, where the clam shell inadvertently is turned into a projectile when the housing is breached; if the integrity of housing 12 is breached by removing cover 122, the potential energy of power spring 14 is released safely as the spring spins around the shaft.

Spring clutch 17 may be any kind of coupling to transfer torque from shaft 16 to the brake camshaft (not shown). Preferably, spring clutch 17 is wire wound spring clutch, either round or square shaped, and engages the brake camshaft, typically S-shaped, by camping down on it and acting as a one-way clutch to synchronously transmits torque without slipping. However, any other type of clutch suitable for the task may be used.

In accordance with one embodiment of the invention, as the brake is released, spring clutch 17 permits the ready disengagement and reengagement of the coupled shafts, so that slack caused by break lining wear is automatically adjusted. A manual slack adjustment means is provided by the exteriorized end 171 of clutch 17. Therein, a manual adjustment to the slack can be made by advancing the brake camshaft by ratcheting it with end 171 until the slack is eliminated.

Figure 5:
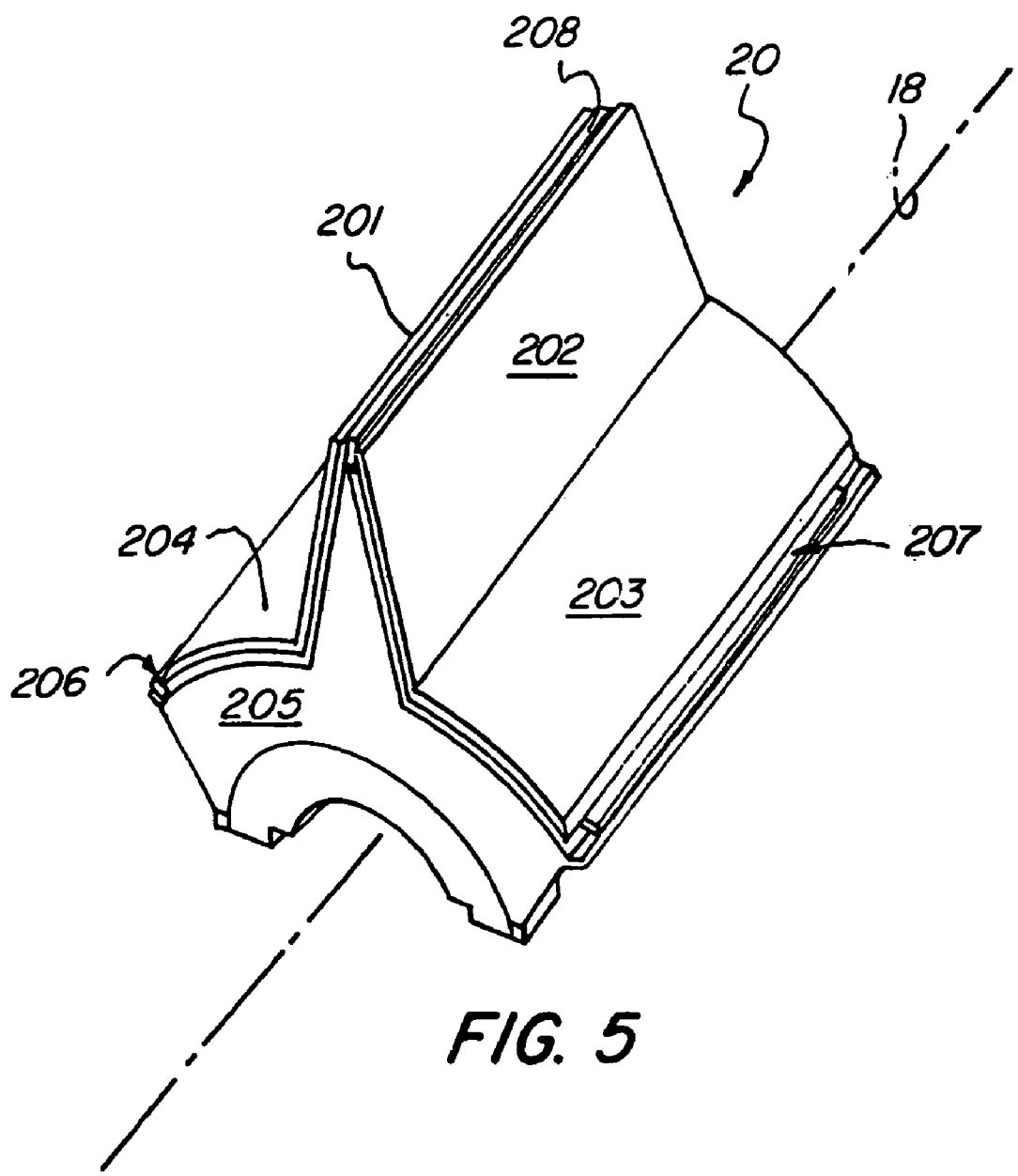
FIG. 5 is an isometric view of the vane of a brake actuator in accordance with one embodiment of the invention.

FIG. 5 is an isometric view of the vane in accordance with one embodiment of the invention. Vane 20 is sized to fit the shape of housing 12 and to be especially advantageously shaped to mate with valve body 121 and cover 122. Therein, vane 20 has a longitudinal axis parallel with axis 18 and includes pressure receiving surfaces 201 and 202, slideable surfaces 203 and 204, and base portion 205. Pressure receiving surfaces 201 and 202 receive pneumatic pressure that is introduced into brake actuator 10 in response to selective driver-operator action. Slideable surfaces 203 and 204 contact the sidewalls of housing 12. Surfaces 201 through 204 are made of a durable material that is advantageously selected for the task and are supported by base portion 205 equally suitably selected for the task.

Disposed near the edge of surfaces 203 and 204 are sealant 206 and 207, respectively. Disposed between surfaces 201 and 202 is sealant 208. Sealants 206, 207, and 208 are advantageously selected to provide an effective fluid seal between vane 20 and housing 12 and made of any material suitable for the intended purposes.

Returning to FIG. 4, vane 20 divides valve body 121 into service side 29a and spring side 29b corresponding to the brake actuated upon application of pneumatic pressure on vane 20.

Service side 29a is substantially the volume encompassed by the walls of housing 12, pressure receiving surface 201, and slideable surface 204. Thus, if port 28a introduces pneumatic pressure into brake actuator 10, vane 20 rotates along the curvilinear arrow 200a to enlarge service side 29a. Absent any countervailing pressure from the spring side, service side 29a expands until opposite pressure receiving surface 202 contacts the side of housing 12 opposite port 28a.

Similarly, spring side 29*b* is substantially the volume encompassed by the walls of housing 12, pressure receiving surface 202, and slideable surface 203. Thus, if port 28*b* introduces pneumatic pressure into brake actuator 10, vane 20 rotates along the curvilinear arrow 200*b* to enlarge spring side 29*b*. Absent any countervailing pressure from the service side, spring side 29*b* expands until opposite pressure receiving surface 201 contacts the side of housing 12 opposite port 28*b*.

Bracket 22 secures vane 20 to shaft 16 making shaft 16 responsive to fluid pressure introduced into each side 29. Bracket 22 may be made of any suitable material. In accordance with one embodiment of the invention, bracket 22 is two separate units.

In accordance with one embodiment of the invention, brake actuator 10 is a spring brake actuator and includes no provision for actuating service brakes. A single port introduces pneumatic pressure into the valve body to overcome the biasing force of power spring 14 and includes only one port.

In accordance with one embodiment, shaft 16 is a camshaft that directly actuates the brakes. Provisions for slack adjustments are made by advancing shaft 16 along axis 18 relative to housing 12. Therein, recess 124*b* is an opening through housing 12 along axis 18 through which shaft 16 can be moved.

In accordance with one embodiment of the invention, a automatic slack adjusting mechanism is disposed on brake actuator 10.

What is claimed is:

1. A fluid operated brake actuator, comprising:
   a housing having an interior;
   a shaft rotatable within the interior of the housing, the shaft being rotatable to engage and disengage a brake;
   a vane engaging the interior of the housing and connected to the shaft, the vane being responsive to a fluid pressure to rotate the shaft;
   a torsion power spring for producing torque to bias the shaft in a first rotational direction, the torsion power spring having a central longitudinal channel in which the shaft is rotatably disposed, and having a longitudinal axis coincident with a longitudinal axis of the shaft;
   an inlet port through the housing, the inlet port for introducing fluid pressure into the housing in order to exert a force on the vane in order to rotate the shaft against the bias of the spring; and
   a one-way clutch transferring torque from the shaft to a brake camshaft, wherein, as the brake is released, said one-way clutch permits the ready disengagement and reengagement of the shaft and the brake camshaft, so that slack caused by brake lining wear is automatically adjusted.

2. The brake actuator of claim 1, wherein the clutch further comprises:
   a manual slack adjustment means to reduce slack in the brake, the slack adjustment means connected to the shaft.

3. The brake actuator of claim 1, wherein the clutch further comprises:
   an automatic slack adjustment means to reduce slack in the brake, the slack adjustment means connected to the shaft.

4. The brake actuator of claim 1 further comprising:
   an opening and a recess in the housing; and
   bushings to restrain the shaft in the housing, the bushings disposed in the opening and the recess in the housing.

5. The brake actuator of claim 1, wherein the vane further comprises a pressure receiving surface and a slideable surface disposed with seals.

6. The brake actuator of claim 1, wherein the housing further comprises:
   a service side; and
   a spring side for receiving the fluid pressure in the housing, the sides separated by the vane.

7. The brake actuator of claim 1, wherein the housing further comprises
   a spring side for receiving the fluid pressure in the housing.

8. A method of operating a fluid-operated brake actuator comprising the steps of:
   a) providing a housing, a shaft within the housing, a vane connected to the shaft, and a torsion power spring having a central longitudinal channel in which the shaft is rotatably disposed, and having a longitudinal axis coincident with a longitudinal axis of the shaft;
   b) producing torque to bias the shaft in a first rotational direction;
   c) introducing a fluid pressure into the housing in order to exert a force on the vane, the vane being responsive to the fluid pressure;
   d) rotating the shaft in a second rotational direction, and transferring torque from the shaft to a brake camshaft with a one-way clutch;
   e) engaging and disengaging a brake; and
   f) wherein, as the brake is released, the one-way clutch permits the ready disengagement and reengagement of the shaft and the brake camshaft, so that slack caused by brake lining wear is automatically adjusted.

9. A method of manually adjusting the slack of a fluid operated brake actuator comprising the steps of:
   providing a housing;
   providing a torsion spring having a longitudinal length and a first end enclosed by the housing, the first end connected to the housing;
   providing a shaft that is actuated by the torsion spring, the shaft having an axis centered on the longitudinal length;
   providing a brake camshaft;
   providing a one-way clutch for transferring torque from the shaft to the brake camshaft, wherein, as the brake is released, the one-way clutch permits the ready disengagement and reengagement of the shaft and the brake camshaft, so that slack caused by brake lining wear is automatically adjusted, the one-way clutch also including a manual slack adjustment means;
   determining the amount of slack in the camshaft; and
   advancing the camshaft along the axis relative to the housing by ratcheting the manual slack adjustment means until the slack is reduced.

10. A fluid operated brake actuator, comprising:
    a housing with an interior;
    a shaft rotatable within the housing, the shaft being rotatable to engage and disengage a brake;
    a vane engaging the interior of the housing and the vane dividing the interior of the housing into a first portion and a second portion, the vane connected to the shaft and the vane being responsive to a fluid pressure to rotate the shaft;
    a torsion power spring for producing torque to bias the shaft in a first rotational direction, the torsion power spring having a central longitudinal channel in which the shaft is rotatably disposed, and having a longitudinal axis coincident with a longitudinal axis of the shaft;

a first inlet port through the housing, the first inlet port for introducing fluid pressure into the first portion of the housing in order to exert a first force on the vane;

a second inlet port through the housing, the second inlet port for introducing fluid pressure into the second portion of the housing in order to exert a second force on the vane;

a one-way clutch transferring torque from the shaft to a brake camshaft, wherein, as the brake is released, said one-way clutch permits the ready disengagement and reengagement of the shaft and the brake camshaft, so that slack caused by brake lining wear is automatically adjusted;

wherein the shaft is rotated to disengage the brake when the first force is greater than the second force and the bias of the spring; and wherein the shaft is rotated to engage the brake when the first force is less than the second force and the bias of the spring.

11. A fluid operated brake actuator, comprising:

a housing;

a shaft rotatable within the housing, the shaft being rotatable to engage and disengage a brake;

a vane connected to the shaft, the vane being responsive to a fluid pressure to rotate the shaft;

a torsion power spring for producing torque to bias the shaft in a first rotational direction, the torsion power spring having a central longitudinal channel in which the shaft is rotatably disposed, and having a longitudinal axis coincident with a longitudinal axis of the shaft, and the torsion power spring being enclosed by the housing;

an inlet port through the housing, the inlet port for introducing fluid pressure into the housing in order to exert a force on the vane in order to rotate the shaft against the bias of the spring; and a one-way clutch transferring torque from the shaft to a brake camshaft, wherein, as the brake is released, said one-way clutch permits the ready disengagement and reengagement of the shaft and the brake camshaft, so that slack caused by brake lining wear is automatically adjusted.

* * * * *